United States Patent
Henrion et al.

(10) Patent No.: US 6,469,982 B1
(45) Date of Patent: Oct. 22, 2002

(54) METHOD TO SHARE AVAILABLE BANDWIDTH, A PROCESSOR REALIZING SUCH A METHOD, AND A SCHEDULER, AN INTELLIGENT BUFFER AND A TELECOMMUNICATION SYSTEM INCLUDING SUCH A PROCESSOR

(75) Inventors: Michel André Robert Henrion, Brussels (BE); Olivier Bonaventure, Gembloux (BE); Peter Irma August Barri, Bonheiden (BE); Emmanuel Desmet, Oostende (BE); Johan Gabriël August Verkinderen, Gent (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/363,039

(22) Filed: Jul. 29, 1999

(30) Foreign Application Priority Data

Jul. 31, 1998 (EP) .............................. 98401959
Jul. 19, 1999 (EP) .............................. 99401811

(51) Int. Cl.$^7$ ................................. H04J 3/24
(52) U.S. Cl. .................. 370/230; 370/395.43; 370/468
(58) Field of Search ................. 370/230, 235, 370/395.1, 395.4, 395.41, 395.42, 395.43, 465, 468, 437, 439, 230.1, 231, 232, 233, 234, 235.1, 236

(56) References Cited

U.S. PATENT DOCUMENTS 5,566,175 A * 10/1996 Davis .......................... 370/468
5,850,398 A * 12/1998 King, Jr. ..................... 370/230
5,936,958 A * 8/1999 Soumiya et al. ............ 370/389
5,946,297 A * 8/1999 Calvignac et al. .......... 370/230
5,949,758 A * 9/1999 Kober ......................... 370/232

FOREIGN PATENT DOCUMENTS

EP  0 712 220 A1  5/1996
EP  0 810 809 A2  12/1997

OTHER PUBLICATIONS

Bonaventure, O.: "A Flexible Buffer Acceptance Algorithm to Support the GRF Service Category in ATM Switches", IFIP ATM98 workshop, Jul. 20–22, 1998, pp. 71/1 to 71/10.

* cited by examiner

Primary Examiner—Ricky Ngo
(74) Attorney, Agent, or Firm—Sughrue Mion, PLLC (57) ABSTRACT

The method shares available bandwidth on a common link in a communication network among a plurality of data flows which are transmitted via the common link. The method is used by a processor and includes sharing reserved bandwidth included in the available bandwidth among the plurality of data flows, and sharing unreserved bandwidth among the plurality of data flows according to a respective unreserved data packet share which is associated to each one of the plurality of data flows. The unreserved bandwidth is included in the available bandwidth in excess of the reserved bandwidth. The sharing of the unreserved bandwidth includes associating to one of the plurality of data flows a respective adaptable administrative weight and determining the respective unreserved data packet share which is associated to the one data flow as a function of its respective adaptable administrative weight.

34 Claims, 1 Drawing Sheet

Figure

METHOD TO SHARE AVAILABLE BANDWIDTH, A PROCESSOR REALIZING SUCH A METHOD, AND A SCHEDULER, AN INTELLIGENT BUFFER AND A TELECOMMUNICATION SYSTEM INCLUDING SUCH A PROCESSOR

BACKGROUND OF THE INVENTION

The present invention relates to a method to share available bandwidth, a processor realizing such a method and a scheduler, an intelligent buffer and a telecommunication system.

Such a method to share available bandwidth is already known in the art, e.g. from the article "A flexible buffer acceptance algorithm to support a guaranteed frame rate service category in asynchronous transfer mode ATM switches" written by O. Bonaventure and presented at IFIP ATM 98 workshop, Jul. 20–22, 1998 pages 77/7 to 71/10. Therein, a flexible buffer acceptance algorithm to support the Guaranteed Frame Rate GFR service category in Asynchronous Transfer Mode switches is described. The GFR service is one of the service categories which are specified for different kind of network applications. For each kind of service, a set of parameters is given in order to describe the traffic presented to the network and the Quality of Service which is required of the network. In order to meet the desired QOS objectives different kind of traffic control mechanisms are defined.

A method to share available bandwidth on a common link in a communication network among a plurality of data flows which are transmitted via the common link is described in this article, in particular, for the guaranteed frame rate GFR service. It is described in this article that the objective of the Guaranteed Frame Rate GFR service category is to provide a service with a minimum guaranteed bandwidth which is easy to use for the end-systems. While no modifications are strictly required to the end-systems to benefit from the guaranteed frame rate GFR service category, particular functional blocks such as switches or routers must be enhanced to support this service category.

Indeed, in section 2 of the above mentioned paper it is mentioned that the main motivation behind the introduction of the GFR service category was to keep the simplicity of the Unspecified Bit Rate service category UBR while providing a better service by allowing a minimum guaranteed bandwidth to be associated with each virtual connection, called in this application data flow, which make use of such a common link. A traffic contract for such a GFR service includes the definition of a Minimum Cell Rate MCR for each data flow. Such a minimum cell rate MCR corresponds to a minimum guaranteed bandwidth, expressed e.g. in cells per second. The minimum guaranteed bandwidth is the minimum bandwidth which is guaranteed at any time for each established data flow following its contract and is determined during connection set-up of the data flow. This means that the guaranteed bandwidth is available on the common link for each established data flow and that it is used or not used for this established data flow.

In this way, a method to share available bandwidth on a common link includes a step of sharing reserved bandwidth included in the available bandwidth among the plurality of data flows. A possible way to share the available bandwidth, as it is described in the article for the GFR service, is in function of its minimum cell rate MCR.

It has to be remarked that, as it is also mentioned in the article, the available bandwidth which is shared among the data flows in proportion to their MCR is not necessarily a constant bandwidth. Indeed, in addition to the GFR service category, an e.g. ATM switch might be able to support other service categories. In such a multi-service switch, the available bandwidth to the GFR service data packet streams is not constant anymore but depends on the amount of higher priority traffic e.g. real-time traffic. This means that the total bandwidth over the common link might be bigger and distributed to other kinds of services like real time services whereof in time delivery of the packets is important. It has to be understood that connection admission control algorithms ensure that a predefined average bandwidth is always available to the GFR data flows above the sum of the different minimum cell rates of all GFR data flows.

It is also mentioned in the article that the GFR service also provides the advantage to the end-system to transmit data packets, which are included in such a data flow, in excess of the minimum cell rate MCR being associated to its data flow. A method to share available bandwidth which is mentioned in the article of paragraph 7.1, i.e. the Double EPD mechanism, has however the drawback that the allocation of the excess bandwidth, called unreserved bandwidth can not be controlled at all. On the other hand, paragraph 7.3 of the article mentions two algorithms which are controlling this unreserved bandwidth: one implementation provides a fair allocation of the unreserved bandwidth and another implementation distributes the unreserved bandwidth in proportion to the MCR of the data flows. In this way, a method to share available bandwidth on a common link includes a step of sharing unreserved bandwidth, which is in excess of the reserved bandwidth, according to a respective unreserved data packet share which is associated to each one of the data flows.

A drawback of these prior art algorithms is that they are however sharing the unreserved bandwidth following a particular strategy e.g. fair share for all data flows or a share in function of their minimum cell rate MCR. This means that the unreserved data packet share is predefined by the known algorithms. There is no flexibility for the network operators to define their own policies for sharing the excess bandwidth.

SUMMARY OF THE INVENTION

An object of the present invention is to provide a method to share available bandwidth such as the above known types but which provides to the network operator the flexibility to define their own policies for sharing the unreserved bandwidth.

According to the invention, this object is achieved by the method to share available bandwidth, and a processor realizing the method, and a scheduler, a intelligent buffer and a telecommunication system including such a processor.

Indeed, due to the fact that the step of sharing the unreserved bandwidth includes associating to one of the data flows a respective adaptable administrative weight and the step of determining the respective unreserved data packet share of this data flow in function of its respective adaptable administrative weight, the network operator has the ability, in addition to the sharing of the reserved bandwidth, to provide administrative weights for each data flow. These administrative weights are reflecting the operator's policy to share the unreserved bandwidth.

The flexibility of the proposed method of the invention allows the network operator not only to support the policies of the prior art solutions, i.e. providing a fair allocation or distribution of the unreserved bandwidth following the minimum cell rates of the data flows, but also to define its own policy e.g. an operator can favor its own local network traffic over transit traffic coming from another network.

It has to be explained that different kinds of implementations are possible in order to translate a share of the unreserved bandwidth. Indeed, the adaptable administrative weight can be implemented by a "weight" of the unreserved bandwidth, i.e. a percentage of the unreserved bandwidth e.g. adaptable administrative weight equal to 30%; but another implementation can be translated by a "rate" e.g. data packet rates in proportion to each other. This will become more clear in the following paragraph.

The adaptable administrative weights can be used by the network operator in order to give a different fraction of the unreserved bandwidth to the different data flows.

A first example is given in the event when the network operator wants that all the data flows receive a same fraction of the unreserved bandwidth, then the operator enters for all the data flows a same adaptable administrative weight e.g. 1.

A second example is given in the event when the network operator wants to distribute the unreserved bandwidth in proportion to the minimum guaranteed bandwidth, the adaptable administrative weights of the different data flows should be set to e.g. its minimum data packet rate.

A third example is given in the event when the network operator wants to support two types of data flows e.g. gold data flows and normal data flows. Presume that the gold data flows are receiving a ten times larger fraction of the unreserved bandwidth than the normal data flows. This can be implemented in two different ways:

- each adaptable administrative weight of a gold data flow is a value which is ten times larger than the value of each administrative weight of a normal data flow. In this way, each gold data flow receives a share of the unreserved bandwidth that is ten times larger than the share of the unreserved bandwidth for a normal data flow. This implementation is independent of the number of data flows included in the gold class of data flows and independent of the number of data flows included in the normal class of data flows; and
- the global share of the unreserved bandwidth for all the gold data flows together is ten times larger as the global share of the unreserved bandwidth for all the normal data flows together, whereby this global gold share is equally divided among the number of gold data flows and the global normal share is equally divided among the number of normal data flows. The adaptable administrative weights are implemented accordingly. This implementation is dependent of the number of data flows included in the gold class of data flows and of the number of data flows included in the normal class of data flows.

It has to be remarked that, an advantage of the method of the invention becomes clear with the following possible implementation of the adaptable administrative weight. Indeed, when the adaptable administrative weight is made dependent of other parameters such as e.g. time, the network operator implements its policy in advance whereby later on the administrative weights are changing i.e. are adapted, in function of such a parameter, without any actual intervention of the operator. This will become more clear with the following example. In the event when the operator wants to give to all the data flows a same fraction of the unreserved bandwidth during peak periods of the day and when the operator wants to support two classes of data flows, as described above with gold data flows and normal data flows, during the rest of the day, the data flows are receiving an adaptable administrative weight which are a function of a time-counter. In this way, the operator implements its policy in advance whereby e.g. during a predefined time moment of a day the values of the adaptable administrative weights are adapted, without any actual intervention of the operator, whereby the administrative weights of the different data flows are all receiving a same value. Later on at a second predetermined time, the administrative weights are again adapted, without any actual intervention of the operator, whereby the administrative weights of the different data flows are receiving a value according to the gold data flow or a value according to the normal data flow. Even more, the adaptable administrative weight might depend on more than one variable. Indeed, according the above example, beside the time counter a variable might be entered for each class of data flow e.g. WG for the gold class of data flows or WN for the normal class of data flows, whereby a relative value of a data packet rate is given to WG and to WN. In the event when e.g. the gold class of data flow would receive three times more bandwidth than the normal class of data flows the WG variable is put to 1 and the WN variable is put to 1/3. However, in the event when the operator wants to the change the bandwidth share for each class of data flows, only the value of the variables WG and WN needs to be adapted e.g. WG is put to 1 and WN is put to 1/4.

A more efficient use of the available bandwidth is to distribute the unreserved bandwidth towards active data flows i.e., data flows whereof at least one data packet is included in the buffer means which is coupled to the processor of the invention. Indeed, a possible way to share the unreserved bandwidth according to the method of the invention is to distribute a share of the unreserved bandwidth to all the established data flows. However, the share for a data flow that is transmitting e.g., data packets in bursts and whereof no data packet is currently present in the buffer could better be used by other data flows.

It has to be remarked that the method of the invention efficiently supports the coexistence of data flows with and without a minimum bandwidth guarantee, which is an advantage in order to support different kinds of service categories. Therein it is described that the processor according to the present invention further includes first determining means to determine the respective reserved data packet share in function of a minimum data packet rate which is associated to each data flow and which guarantees for each data flow a minimum guaranteed bandwidth, and that the control means is further included in the processor to activate the second processing means in the event when the minimum guaranteed bandwidth is respected due to the first processing means. In this way the unreserved bandwidth is only shared if all data flows, or according to the above described implementation if all active data flows, are already receiving their minimum guaranteed bandwidth with the step of sharing the reserved bandwidth.

Different kinds of service categories which are supporting a minimum bandwidth guarantee are known, however an important application of the present invention is that the processor of the invention supports the guaranteed frame rate service category in an asynchronous transfer mode telecommunication system. It has to be remarked that, in the event when the method of the invention is used to support the guaranteed frame rate service category, the method de-couples the sharing process of the unreserved bandwidth from the provisioning of the minimum bandwidth guarantees.

An advantage of the method according to the invention is that in order to support best effort data flows together with data flows with a minimum guaranteed bandwidth, according to prior art implementations, a minimum bandwidth is usually implicitly defined and reserved for each data flow. This is however not necessary when the available bandwidth is shared according to the method of the invention. Indeed, data flows which have a predefined minimum data packet share which is equal to zero are allowed to have an adaptable administrative weight which is different from zero and are getting a share of the unreserved bandwidth according to an unreserved data packet share being a function of its adaptable administrative weight when e.g. the data flow becomes active.

Yet, it has to be remarked that the processor of the invention can be implemented as mentioned above with fixed-length data packets, e.g., ATM cells but that it is also possible to extend the implementation of the processor according to the invention to support as well variable length packets, e.g., Internet Packets. In this way, the processor of the invention supports, e.g., a controlled load service in an Internet Protocol Telecommunication system.

In another implementation according to the present invention, the processor further controls a buffer means that stores received data packets. Furthermore the step of sharing reserved bandwidth is constituted by a first process of sharing guaranteed bandwidth up to an amount of reserved bandwidth. The reserved bandwidth is predefined for each data flow and is included in the available bandwidth. The step of sharing unreserved bandwidth is constituted by a second process of sharing non-guaranteed bandwidth among the plurality of data flows according to a respective non-guaranteed bandwidth share. The non-guaranteed bandwidth comprises the unreserved bandwidth as well as the actually unused part of the reserved bandwidth. The unreserved bandwidth is included in the available bandwidth in excess of the reserved bandwidth. The second process of sharing the non-guaranteed bandwidth includes associating the respective adaptable administrative weight to at least one of the data flows. The respective non-guaranteed bandwidth share is herewith determined as a function of the respective adaptable administrative weight associated to the data flow.

A drawback of an implementation with two processors is that the first processor works with a non-work conserving principle that updates relevant scheduling parameters as a function of a real time clock, while the second processor works with a work conserving principle that updates relevant scheduling parameters as a function of a virtual time clock. Hereby, two distinct schedulers are required to handle the respective scheduling parameters: a first scheduler to handle the scheduling parameters versus the real time clock and a second scheduler to handle the scheduling parameters versus the virtual time clock.

A further implementation of the present invention that avoids the above drawback. Indeed, such a method further includes performing at each service time moment the steps of:

determining, by means of a mode determining means included in the control means, whether for at least each active data flow of the plurality of data flows, a respective entitled reserved bandwidth share of said reserved bandwidth has been reached or not; and selecting, when at least one active data flow has not reached its respective entitled reserved bandwidth share, one of the plurality of active data flows not having reached its entitled reserved bandwidth share, whereby guaranteed bandwidth is granted at the service time moment, and selecting, when each one of the plurality of active data flows has reached its respective entitled reserved bandwidth share, one of the plurality of active data flows, whereby non-guaranteed bandwidth is granted at that service time moment.

Accordingly, this implementation makes use of a mode determining means which readily indicates, at each service time moment, under which mode G or NG bandwidth should be granted to a data flow, i.e. whether, at that service time moment, guaranteed bandwidth is to be granted in mode G or non-guaranteed bandwidth is to be granted in mode NG.

A first advantage of such an implementation is that, due to the foregoing decision made by the mode determining means, only one scheduler is really necessary to execute the subsequent data flow selection process for granting guaranteed or non-guaranteed bandwidth. Indeed, the common scheduler selects for at service time moment, according to its mode G or NG, either a data flow out of the plurality of active data flows that have not yet reached their entitled reserved bandwidth share, in mode G, or just one of the plurality of active data flows, in mode NG.

In this way for each data flow it is determined, whether or not it has been so far granted with its entitled number of cell service time occurrences which means that its guaranteed bandwidth granted condition is reached, i.e. when its respective entitled reserved bandwidth share is reached. Herewith the scheduler operates either in mode G, when at least one active data flow has not reached its guaranteed bandwidth granted condition, or the scheduler works in mode NG when either all data flows have reached thier guaranteed bandwidth granted condition or when all the data flows that have not reached their guaranteed bandwidth granted condition are inactive.

A second advantage of such an implementation is that, when sharing guaranteed bandwidth in mode G, the operation of the scheduler is here work conserving, since Mode G is always performed in priority over Mode NG.

According to such an implementation, a further characteristic feature is described such that the method further includes the steps of:

associating to each one of the plurality of data flows a respective service grant counter and;

initializing the service grant counter at each start of a predefined time period to a respective predefined initial credit value that is derived from the reserved bandwidth as being equal to the corresponding number of entitled service grants for reserved bandwidth during the predefined time period; and updating, at each service time moment, the respective service grant counter that is associated to the data flow being served at the service time moment, until a respective predefined end value is reached for the respective service grant counter; and detecting that an entitled respective reserved bandwidth share of a data flow is reached when the associated service grant counter reached the respective predefined end value.

This principle comprises the control of the scheduling operation for each data flow, over a predetermined time period, by means of a per data flow service grant counter for each session that is initialized with a credit value that reflects the corresponding number of entitled service grants for reserved bandwidth for that data flow over the new time period. Thus, by monitoring the current content of the respective service grant counters of all data flows, the scheduler to work, at each service time moment, either in mode G or in mode NG.

It has to be remarked here that the present invention is not limited to implementations such as described above i.e.

initializing the respective service grant counters at the beginning of a predefined time period with a predetermined amount of credits and updating the respective service grant counters each time when the associated data flow is served. Indeed, an alternative implementation of the present invention is realized in the event when the respective service grant counters are provisioned on a continuous base proportional to the corresponding number of entitled service grants for reserved bandwidth for its data flow. Such an implementation provides a better performance and avoids a periodic initialization at the beginning of a predefined time period.

A further characteristic feature is described that, when successively serving complete packets of variable length, the step of updating the respective service grant counter is performed by counting a number of service grants in proportion to the length of the served packet. Indeed, in this way the scheduler allows to handle as well fixed length data packets as variable length data packets, i.e., complete frames.

A further remark is that different organization approaches are possible for initializing the service grant counters.

A first solution is described that the predefined time period has the same duration for all data flows.

A further solution is described in that the predefined time period of the same duration is synchronized for all data flows. In this way, the step of initializing the service grant counter of each data flow at each start of the predefined time period is performed simultaneously for all service grant counters of all data flows.

Another alternative solution is described in that the predefined time period of same duration is not synchronized for all data flows. The step of initializing the service grant counter of each data flow at each start of the predefined time period is not performed simultaneously for all service grant counters of all data flows.

Another implementation of the time intervals is described whereby the predefined time period has a specific duration, possibly different, for each data flow. Indeed, in such an alternative solution, the data flow scheduling time intervals have a different duration for each data flow and their time intervals are mutually phased asynchronously. The scheduler operation is no longer correlated at all for all data flows as in the first solution or, to a lesser extent, as in the previous solution.

A further characteristic feature to implement the present invention comprises determining whether a respective entitled reserved bandwidth share of the reserved bandwidth has been reached or not for at least each active data flow, includes a mode determining means using a common guaranteed bandwidth share data flow counter. The common guaranteed bandwidth share data flow counter records the current number of active data flows which have not reached so far their respective entitled reserved bandwidth share of the reserved bandwidth.

Furthermore, it is to be explained that, in order to implement the present invention, different types of scheduling arrangements are possible. These scheduling arrangements are described and are explained in further paragraphs.

An output signal of the processor i.e. a shared bandwidth signal which is a measure for the respective reserved data packet share and the respective unreserved data packet share is provided at an output of processor. It has to be remarked that this shared bandwidth signal can be implemented in different ways.

A possible way to reflect the result of the shared reserved bandwidth and the shared unreserved bandwidth is to generate a sequence of identifications of the data flows which are allowed to transmit its following data packet on the common link. This can be realized with a scheduler included in a communication network in order to share available bandwidth on a common link among a plurality of data flows. The scheduler includes a buffer means in order to sort the incoming data packets according to the data flow whereto the data packets belong into a plurality of buffer queues. Each buffer queue included in the buffer means is associated to a data flow. In this way a plurality of sorted data packets in the different buffer queues is provided. The scheduler includes also selection means in order to select one of the sorted data packets and in order to transmit the selected data packet on the common link. The scheduler further includes the processor according to the invention that is coupled to the selection means. The shared bandwidth signal of the processor is provided to the selection means in order to control the selection of the sorted data packets of the different queues.

It has to be remarked that the sorting function of the buffer means can be implemented in different ways i.e. physical queuing or logical queuing. Indeed, a possible implementation is to put the content of the whole data packet in different queues but however, another implementation is that the data packets are associated to e.g. an identification number and that the content of the data packets are physically not sorted at all but stored all together in one memory. The further processing is executed with the identification numbers until a data packet associated to a particular identification number is allowed to leave the buffer means.

Another way to reflect the result of the shared reserved bandwidth and the shared unreserved bandwidth is to generate according to a received data packet of a particular data flow an acceptance command or a discard command. This can be realized with an intelligent buffer being included in a communication network in order to share available bandwidth on a common link among a plurality of data flows that are transmitted via the common link. The intelligent buffer includes decision means in order to decide whether to accept or to discard an incoming data packet of one of the data flows. When the incoming data packet is accepted, it is stored in a buffer means, e.g., a first in first out buffer in order to be transmitted later on at the common link. The intelligent buffer further includes the processor according to the invention that is coupled to the decision means. The shared bandwidth signal of the processor is provided to the decision means in order to control the decision according to the shared bandwidth signal.

A third application of the present invention is a telecommunication system that includes at least one processor according to the present invention.

BRIEF DESCRIPTION OF THE DRAWINGS

The above and other objects and features of the invention will become more apparent and the invention itself will be best understood by referring to the following description of an embodiment taken in conjunction with the accompanying FIGURE which represents a scheduler including a processor according to the present invention.

First, a functional description of the functional blocks shown in the figure will be provided. Based on this description, implementation of the functional blocks of the FIGURE will be obvious to a person skilled in the art. In addition, the working of the method of the invention will be described in further detail.

DETAILED DESCRIPTION OF THE INVENTION

Figure 1:
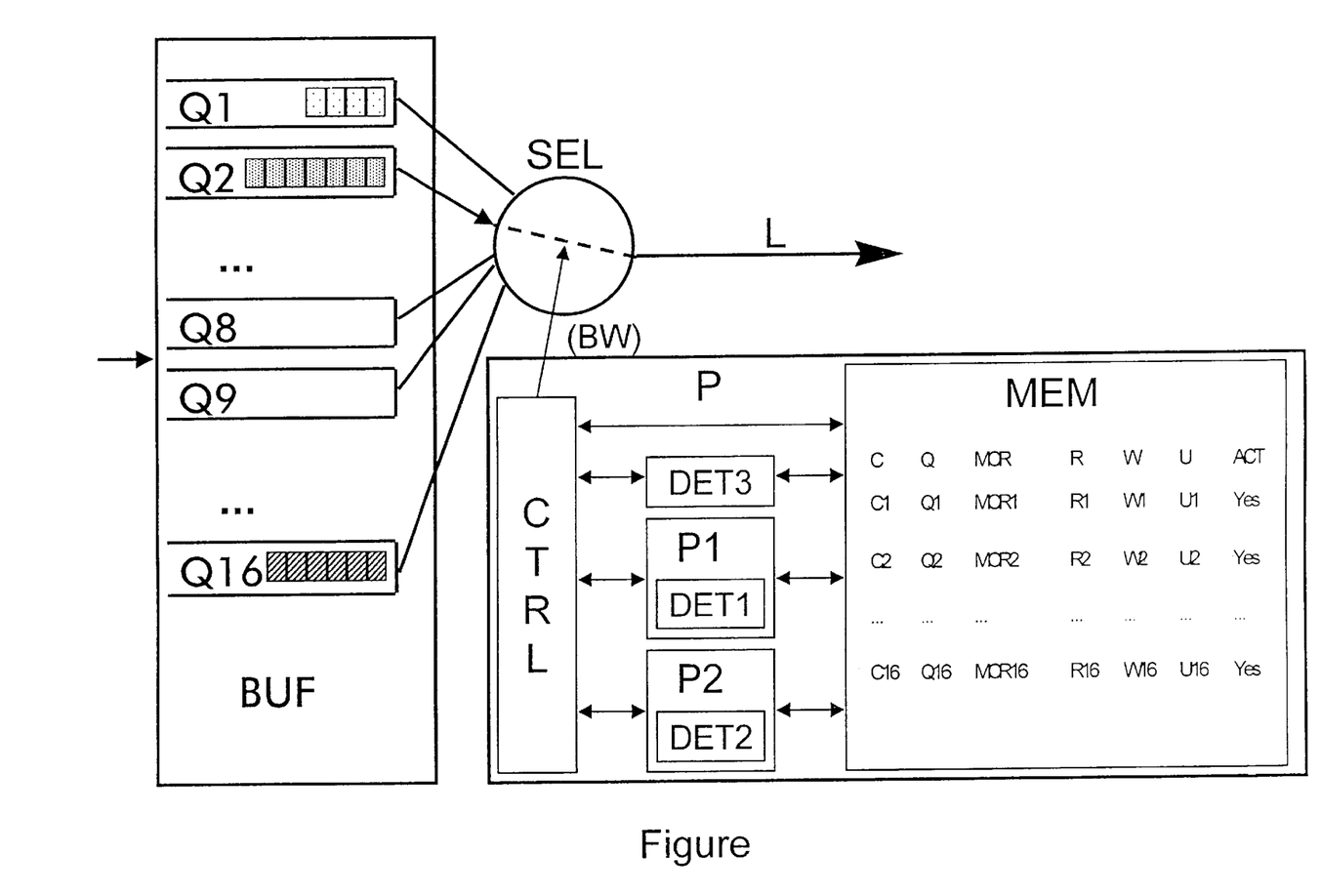

It is preferred for this particular embodiment to describe a scheduler which is included in an asynchronous transfer mode telecommunication multi-service switch which supports among other services the guaranteed frame rate service GFR in an ATM communication system.

The scheduler of the FIGURE is included in the ATM switch in order to guarantee to each GFR data flow its minimum guaranteed bandwidth. In order to be able to support this minimum guaranteed bandwidth for each GFR data flow the scheduler receives from the ATM switch available bandwidth which is predetermined for the all the GFR data flows together. The part of the bandwidth from the available bandwidth that is used to provide to each GFR data flow at least its minimum bandwidth is called the reserved bandwidth. However, in excess over this reserved bandwidth the available bandwidth includes some unreserved bandwidth that is allowed to be shared by the operator according to its own policy. Referring to the FIGURE, a scheduler is shown which shares the reserved bandwidth and the unreserved bandwidth among a plurality of data flows that needs to be transmitted on the common link L. This common link L, shown in the FIGURE, is coupled to the scheduler.

It is preferred for this particular embodiment that the plurality of data flows is equal to 16. This means that the scheduler is dimensioned in order to support 16 GFR data flows.

A further remark is that, since the scheduler of this embodiment supports an ATM switch, it has to be understood that each data flow represents an ATM virtual connection/path that is identified by its virtual identification.

Referring to the FIGURE, the scheduler includes a buffer BUF, a selector SEL and a processor P according to the present invention. The buffer BUF is coupled to the selector SEL and to the processor P. The selector SEL is coupled via an output of the scheduler to the common link L. The processor P is also coupled to the selector SEL.

The buffer BUF includes one input and 16 outputs. In order not to overload the FIGURE, only 5 outputs are shown. The input is shown with an arrow going towards the buffer and each shown output is represented by a line which leaves the buffer BUF.

The buffer BUF includes for each supported data flow a buffer queue. Only the five buffer queues associated to the five shown outputs are shown in the figure: Q1, Q2, Q8, Q9 and Q16. Each buffer queue e.g. Q2 is associated to one data flow which is identified by its identification number e.g. C2. The buffer BUF sorts each data packet which enters the scheduler at the input of the buffer BUF into one of the buffer queues according to the identification of the data flow whereto the data packet belongs. In this way, a plurality of sorted data packets is provided.

In order to describe this embodiment, presume that five data flows C1, C2, C8, C9 and C16 are established according to the five shown buffer queues Q1, Q2, Q8, Q9 and Q16. The sorted data packets are shown in the FIGURE by means of shaded blocks included in each queue according to its data flow identification. It has to be understood that the FIGURE shows an actual situation at a predefined time moment. In this way it can be seen on the figure that some buffer queues are actual including data packets e.g. Q1, Q2 and Q16 and other buffer queues are not including data packets e.g. Q8 and Q9. Each shaded block represents a number of data packets of the associated data flow.

The selector SEL is included in the scheduler in order to select at regular time moments one of the buffer queues and to provide to this buffer queue a control signal in order to allow this selected buffer queue to transmit the first data packet in its queue via the selector SEL on the common link L. It has to be remarked that the selector SEL in fact acts as switch on/off towards each output of the buffer BUF. A further remark is that the detailed operation of this selector SEL and this buffer BUF is known to a person skilled in the art and will not be explained here in further detail since this goes beyond the scope of the invention.

The processor P is included in the scheduler in order to control the selection function of the selector SEL. In order to execute this operation the processor P provides a control signal i.e. a shared bandwidth signal BW to the selector SEL.

The processor P includes a first processor P1, a second processor P2, a controller CTRL, a third determiner DET3 and a memory MEM. The first processor P1, the second processor P2 and the controller CTRL are coupled to the memory MEM. The first processor P1 and the second processor P2 are also coupled to the controller CTRL.

The first processor P1 shares the reserved bandwidth included in the available bandwidth among the 5 established data flows according to a respective reserved data packet share. It has to be understood that a data flow only receives reserved bandwidth in the event when there is bandwidth needed i.e. in the event when the connection is established and that data packets are transmitted. Furthermore, the respective reserved data packet share is, according to the guaranteed minimum bandwidth of a data flow of this particular embodiment, in function of a minimum data packet rate called MCR. This minimum data packet rate is agreed in the GFR service contract at connection establishment of the data flow. In this way the following minimum data packet rates are defined for each established connection:

data flow C: MCR1;
data flow C2: MCR2
data flow C8: MCR8;
data flow C9: MCR9;
data flow C16: MCR16;

In the event when a data flow is established e.g. C2 and data packets are transmitted at a certain data packet rate, the data flow receives at least the needed bandwidth according to this minimum data packet rate e.g. MCR2.

The first processor P1 includes a first determiner DET1 in order to determine the respective reserved data packet share in function of the minimum data packet rate. How the first determiner DET1 shares the reserved bandwidth according to this minimum data packet rote among the established data flows will be explained in a further paragraph.

The first processor P1 includes furthermore a calculator in order to make some necessary calculations and a reader and a writer in order to interact with the memory MEM and the controller CTRL, however as mentioned above, these functional blocks are not shown in the figure and are not described in further detail.

The second processor P2 shares the unreserved bandwidth included in the available bandwidth in excess over the reserved bandwidth according to a respective unreserved data packet share. As already explained above, the unreserved bandwidth is not an absolute constant amount of bandwidth. Since he scheduler is supporting GFR, it is clear that the unreserved bandwidth includes also the unused reserved bandwidth. In order to reflect different kind of strategies of the operator in the way of sharing the unreserved bandwidth, an adaptable administrative weight W is defined for each established data flow at connection establishment of the data flow. In this way the following adaptable administrative weights are defined for each established data flow:

data flow C1 :W1;
data flow C2: W2;
data flow C8: W8;
data flow C9: W9;
data flow C16: W16;

The second processor P2 includes a second determiner DET2 in order to determine the respective unreserved data packet shares in function of these adaptable administrative weights. It has to be remarked that the unreserved bandwidth is in this particular embodiment shared among the active data flows i.e. the data flows having at least one data packet in its associated buffer queue of the buffer BUF. How the second determiner DET2 shares the unreserved bandwidth among the active data flows will be explained in a further paragraph.

The second processor P2 includes also, a calculator in order to make some necessary calculations and a reader and a writer in order to interact with the memory MEM and the controler CTRL, however as mentioned above, these functional blocks are not shown in the FIGURE and are not described in further detail.

The processor P includes also a third determiner DET3 in order to determine a status of the data flows i.e. active data flow or not active data flow. In order to execute this function the third determiner DET controls at the buffer BUF for each buffer queue e.g. Q2 the eventual presence of a data packet. In the event when at least one data packet is present in a data queue the status of the associated data flow is confirmed to be "yes". In the event when no data packet is present in a data queue, the status of the associated data flow is confirmed to be "no". The status of each data flow is provided by the third determiner DET3 to the memory MEM described hereafter and is stored in this memory MEM for each data flow by means of a third variable called status variable ACT.

Furthermore, the processor includes a memory MEM. This memory MEM includes for each data flow the defined information at connection establishment of the data flows i.e. the identification of the data flow C, the associated buffer queue Q, the defined minimum data packet rate MCR, the defined adaptable administrative weight W and therewith three variables: a first variable R and a second variable U which are also associated to each data flow and a third variable called status variable ACT which reflects the status of a data flow regarding active data flow or not active data flow.

It has to be remarked that the association means which is mentioned in the claims to associate to each data flow an adaptable administrative weight is in fact realized by part of this memory MEM. Referring to the FIGURE the above mentioned definition and association is shown by means of a table which is a possible way to implement this memory MEM. The above mentioned association means is implemented in the memory table by the relation between the column of the data flows and the column of the adaptable administrative weights.

The controller CTRL controls the first processor P1 and the second processor P2. According to the provided results i.e. the respective reserved data packet shares and the respective unreserved data packet shares, from the first processor P1 and the second processor P2, respectively, the controller CTRL generates the above mentioned shared bandwidth signal BW. This shared bandwidth signal reflects the global result of the shared reserved bandwidth and the shared unreserved bandwidth. In this embodiment the shared bandwidth signal BW includes the identification of a buffer queue e.g. Q2 which needs to be selected by the selector SEL at the actual time moment. How the controller CTRL comes to the knowledge of such a selected buffer queue identification, called hereafter shortly selected buffer queue, is implemented with an algorithm which is explained in the further paragraphs.

According to this preferred embodiment in order to implement the processor P of the invention a provision of the reserved bandwidth is performed by a non work conserving principle executed by the first processor P1; and the bandwidth which is not used by the first processor P1 is distributed to the active data flows by means of a work conserving principle executed by the second processor P2. The working of these two processors is combined such that the second processor P2 is only activated when the first processor P1 is idle.

A further remark is that it is known to a person skilled in the art that a work conserving principle can be implemented with a virtual time clock whereby the processor P2 performs its functions each time that it has the possibility to do so. The detailed working of a work conserving principle goes beyond the scope of this invention. The aim is the use of a virtual time clock in-stead of a real time clock by the second processor P2 in order to implement the principle working of the second processor P2.

The above two mentioned variables associated to each data flow i.e. associated to each buffer queue are called hereafter time stamp U and time stamp R (see table in the memory MEM) e.g. for data flow C2 time stamp U2 and time stamp R2 are defined. It has to be remarked that during the working of the algorithm the actual value of the R time stamps and the actual value of the U time stamps are incremented according to a method which will be described in a susequent paragraph. Even more, the value of the R time stamp reflects in fact, when being compared with the actual value of the real time clock, a measure of necessity to transmit a data packet of the associated data flow in order to still respect the minimum data packet rate defined for this data flow. In order to understand this it has to be explained that the value of the R time stamp is calculated and adapted in function of its accordingly minimum data packet rate MCR. When imaging a time line from left to right where over the actual time is running from left to right, the different values of the R time stamps can be marked on the time line. When the actual time is still smaller than the smallest value of all the R time stamps, the minimum data packet rates of the different data flows are still respected. No available bandwidth is needed to share among one or another data flow in order to bring its actual data packet rate in accordance with its minimum data packet rate. The left available bandwidth is allowed to be shared among the data flows according the strategy of he operator. When the actual time passed however the position of the smallest value of the R time stamps, i.e. time elapsed for this data flow, time is up to transmit a data packet of this data flow in order to respect again its minimum data packet rate.

At arrival of a data packet in an empty buffer queue the R time stamp and the U time stamp are initiated by the first processor P1 and the second processor P2, respectively. Presume a situation whereby a data packet arrives in an empty buffer queue e.g. buffer Q2, the value of time stamp R2 is calculated in function of a previous value of this time stamp R2__prev, the inverse of the associated minimum data packet rate MCR2 and the value of a real time clock (not shown in the FIGURE) which reflects the actual time T.

The initialization value of the R2 time stamp is calculated by the first processor P1 with the following formula:

$$R2 = \text{Max}\{(R2\_\text{prev}+1/MCR2); T\}$$

i.e. the maximum out of:
- the previous value of the time stamp R2 incremented with the inverse of the associated minimum data packet rate MCR2; and
- the actual time.

With the same example, the value of the time stamp U2 is calculated in function of a previous value of this time stamp U2_prev, the inverse of the associated adaptable administrative weight W2 and the value of a virtual time clock (not shown in the figure) which reflects a virtual time T_virt. The value of the virtual time T_virt for the second processor P2 is equal to the value of the timestamp U2_last which was last selected by the second processor P2.

The initialization value of the U2 time stamp is calculated by the second processor P2 with the following formulae:

$$U2 = \text{Max}\{(U2\_\text{prev}+1/W2); T\_virt\}$$

i.e. the maximum out of:
- the previous value of the time stamp U2 incremented with the inverse of the associated adaptable administrative weight W2; and
- the virtual time T_virt.

It has to be explained that hereafter the use of different control signals between the different functional blocks included in the processor P are explained but are not shown in the FIGURE in order not to overload the FIGURE.

In order to determine a selected buffer queue the controller CTRL provides at predefined regular time moments, according to the transmission rate on the common link L, to the first processor P1 a start control signal. The first determiner DET1 starts searching for the smallest value between the actual values of the R time stamps corresponding to active data flows in the memory MEM. The R time stamp with the smallest value is called minimum R time stamp. The value of the minimum R time stamp is compared with the value of the real time clock.

When the value of the real time clock is larger than the value of the minimum R time stamp, time is up to transmit a data packet of the data flow associated to this minimum R time stamp in order to respect the minimum data packet rate MCR of this data flow. The first processor P1 provides the identification of the buffer queue associated to this minimum R time stamp, i.e. the selected buffer queue towards the controller CTRL. The selected buffer queue is included by the controller CTRL in the bandwidth signal BW whereby the selector SEL is enabled to select the according buffer queue and to transmit the first data packet of this selected buffer queue on the common link L. The first processor P1 also updates the value of the minimum R time stamp in function of the minimum data packet rate of the associated data flow. For example, presume that the minimum R time stamp is the time stamp R2 of the data flow C2. The new value of R2 time stamp is calculated with the following formula:

$$R2 = R2\_\text{previous}+1/MCR2$$

This value is updated in the memory MEM by the first processor P1.

When the value of the real time clock is smaller than the value of the minimum R time stamp, there is still time left to transmit a data packet of another data flow not necessarily associated to this minimum R time stamp i.e. available unreserved bandwidth is left in order to share among the active data flows. The first processor P1 provides to the controller CTRL a control signals which includes this fact, called unreserved control signal. The controller CTRL provides, upon receiving of the first processor P1 such an unreserved control signal, on its turn, to the second processor P2 a start control signal in order to activate this second processor P2. The second determiner DET2 of the second processor P2 starts searching for the smallest value between the actual values of the U time stamps corresponding to active data flows in the memory MEM. The U time stamp with the smallest value is called minimum U time stamp. The second processor P2 provides the identification of the buffer queue associated to this minimum U time stamp, i.e. the selected buffer queue towards the controller CTRL. The selected buffer queue is included by the controller CTRL in the bandwidth signal BW whereby the selector SEL is enabled to select the according buffer queue and to transmit the first data packet of this selected buffer queue on the common link L. The second processor P2 also updates the value of the minimum U time stamp in function of the adaptable administrative weight of the associated data flow. For example, presume that the minimum U time stamp is the time stamp U2 of the data flow C2. The new value of U2 time stamp is calculated with the following formula:

$$U2 = U2\_\text{previous}+1/W2$$

This value is updated in the memory MEM by the second processor P2.

It has to be remarked that a more accurate implementation of the present invention is provided in the event when the algorithm works with one more variable, called last served variable. The value of this variable is the name of the first processor P1 or the name of the second processor P2 according to the processor which provided the identification of the selected buffer queue which last has been included in the shared bandwidth signal BW. The use of such an extra variable controls the fact that in the event when a buffer queue identification e.g. Q16 was included in the bandwidth signal BW due to e.g. the P2 processor results, whereby according to the implemented algorithm, the value of the associated time stamp U16 was incremented, the value of this associated time stamp U16 is not recalculated again when a first data packet arrives in the buffer queue Q16 if this buffer queue Q16 is empty. Small modifications, evident to a person skilled in the art, may be applied to the above described embodiment in order to adapt it to integrate such a last served variable whereby a more efficient use of the reserved bandwidth is established.

The working of the method of the invention will now be described by means of an example which describes a predefined time period during the actual working of the algorithm. Presume the following situation and actual values in the memory MEM the following table shows five established data flows: C1, C2, C8, C9, C16 with its associated buffer queues, its minimum data packet rates, the actual values of its associated R time stamps, its adaptable administrative weights and the actual value of its associated U time stamps:

| C   | Q   | MCR          | R        | W        | U        | ACT |
|-----|-----|--------------|----------|----------|----------|-----|
| C1  | Q1  | MCR1 = 1/10  | R1 = 20  | W1 = 1/3 | U1 = 3   | Yes |
| C2  | Q2  | MCR2 = 5/10  | R2 = 18  | W2 = 1   | U2 = 2   | Yes |
| C8  | Q3  | MCR8 = 1/10  | R8 = 30  | W8 = 1/3 | U8 = 6   | No  |
| C9  | Q9  | MCR9 = 1/10  | R9 = 30  | W9 = 1/3 | U9 = 6   | No  |
| C16 | Q16 | MCR16 = 1/10 | R16 = 10 | W16 = 1  | U16 = 3  | Yes |

Presume, however, that the buffer queue for data flow C8 and data flow C9 are empty. In this way no actual available bandwidth needs to be provided for these two data flows.

Presume that during the working of the algorithm, the controller CTRL provides a next start signal to the first processor P1. The first determiner DET1 of the first processor P1 starts searching for the smallest value between the actual values of the R time stamps in the memory MEM. The R time stamp with the smallest value is R16=10. The value of the R16 is compared with the value of the real time clock. Presume that this real time clock equals T=12 which means that the value of the real time clock is bigger than the value of the R16 time stamp. Time is up to transmit a data packet of the data flow i.e. C16 associated to this minimum R time stamp R16 in order to respect the minimum data packet rate MCR16=$1/10$ of this data flow C16. The first processor P1 provides the identification of the buffer queue Q16 associated to this minimum R time stamp R16, i.e. the selected buffer queue towards the controller CTRL. The selected buffer queue Q16 is included by the controller CTRL in the bandwidth signal BW whereby the selector SEL is enabled to select the selected buffer queue Q16 and to transmit the first data packet of this selected buffer queue Q16 on the common link L. The first processor P1 also updates the value of the minimum R time stamp R16 in function of the minimum data packet rate MCR16=$1/10$ of the associated data flow C16. The new value of R16 time stamp is calculated with the following formula:

$R16=R16\_previous+1/MCR16=10+10=20$

This value is updated in the memory MEM by the first processor P1:

| C   | Q   | MCR          | R        | W        | U        | ACT |
|-----|-----|--------------|----------|----------|----------|-----|
| C1  | Q1  | MCR1 = 1/10  | R1 = 20  | W1 = 1/3 | U1 = 3   | Yes |
| C2  | Q2  | MCR2 = 5/10  | R2 = 18  | W2 = 1   | U2 = 2   | Yes |
| C8  | Q3  | MCR8 = 1/10  | R8 = 30  | W8 = 1/3 | U8 = 6   | No  |
| C9  | Q9  | MCR9 = 1/10  | R9 = 30  | W9 = 1/3 | U9 = 6   | No  |
| C16 | Q16 | MCR16 = 1/10 | R16 = 20 | W16 = 1  | U16 = 3  | Yes |

The algorithms continues whereby the actual time counter is also adapted and incremented towards T=13.

The controller CTRL provides a next start signal to the first processor P1. The first processor P1 starts searching for the smallest value between the actual values of the R time stamps in the memory MEM. The R time stamp with the smallest value is R2=18. The value of the minimum time stamp R2=18 is compared with the value of the real time clock T=13. The value of the real time clock is not bigger than the value of the minimum R time stamp R2, there is still time left to transmit a data packet of another data flow not necessarily associated to this minimum R time stamp R2 i.e. available unreserved bandwidth is left in order to share among the active data flows.

The first processor P1 provides to the controller CTRL an unreserved control signal. The controller CTRL provides, upon receiving of the first processor P1 this unreserved control signal, on its turn, to the second processor P2 a start control signal in order to activate this second processor P2. The second determiner DET2 of the second processor P2 starts searching for the smallest value between the actual values of the U time stamps corresponding to active data flows in the memory MEM. The U time stamp with the smallest value is the minimum U time stamp U2=2. The second processor P2 provides the identification of the buffer queue Q2 associated to this minimum U time stamp U2=2, i.e. the selected buffer queue Q2 towards the controller CTRL. The selected buffer queue Q2 is included by the controller CTRL in the bandwidth signal BW whereby the selector SEL is enabled to select the according buffer queue Q2 and to transmit the first data packet of this selected buffer queue on the common link L. The second processor P2 also updates the value of the minimum U time stamp U2 in function of the adaptable administrative weight of the associated data flow C2. The new value of U2 time stamp is calculated with the following formula:

$U2=U2\text{-previous}+1/W2=2+1=3;$ the second processor provides this value to the memory MEM in order to update it in the table

| C   | Q   | MCR          | R        | W        | U        | ACT |
|-----|-----|--------------|----------|----------|----------|-----|
| C1  | Q1  | MCR1 = 1/10  | R1 = 20  | W1 = 1/3 | U1 = 3   | Yes |
| C2  | Q2  | MCR2 = 5/10  | R2 = 18  | W2 = 1   | U2 = 3   | Yes |
| C8  | Q3  | MCR8 = 1/10  | R8 = 30  | W8 = 1/3 | U8 = 6   | No  |
| C9  | Q9  | MCR9 = 1/10  | R9 = 30  | W9 = 1/3 | U9 = 6   | No  |
| C16 | Q16 | MCR16 = 1/10 | R16 = 20 | W16 = 1  | U16 = 3  | Yes |

In this way the method to share available bandwidth provides to the network operator the flexibility to define its own policies for sharing the unreserved bandwidth. Indeed, the operator can provide another value to the adaptable administrative weights and impose thereby to the algorithm to share the unreserved available bandwidth according to another strategy.

It should be noted that although the above described embodiment of the processor included in the scheduler, is described in an ATM switch which supports among others services the guaranteed frame rate service GFR category, the application of the invention is not reduced to such switches. Indeed, small modifications evident to a person skilled in the art, may be applied to the above described embodiment in order to adapt it to be used in other kind of telecommunication systems which need to share among a plurality of data flows unreserved bandwidth included in available bandwidth in excess over reserved bandwidth according to the strategy of the operator like e.g. a variable length packet telecommunication system such as the internet protocol routers.

In a second embodiment, a scheduler is also used to share both guaranteed bandwidth and non-guaranteed bandwidth, on the basis of two scheduling parameters per data flow, a reserved bandwidth scheduling parameter for the former and an administrative weight scheduling parameter for the latter.

It has to be explained that the description of this second embodiment refers for some aspects to the present FIGURE. Furthermore, some abbreviations are used in the following paragraphs that are describing this second embodiment, in order to facilitate the understanding. However, these abbreviations are not pointing to references that are used in the present FIGURE.

This scheduler is mostly similar to the one illustrated in the FIGURE, except that its processor P does not comprise two distinct processing means P1 and P2. Indeed, the two steps of sharing reserved bandwidth and sharing non-guaranteed bandwidth are here constituted by two exclusive sharing processes among the plurality of (active) data flows, namely:

A first process of sharing guaranteed bandwidth (up to an amount of reserved bandwidth); and A second process of sharing non-guaranteed bandwidth.

The non-guaranteed bandwidth comprises the unreserved bandwidth as well as the actually unused part of the reserved bandwidth. The unreserved bandwidth is included in the available bandwidth in excess of the reserved bandwidth.

Accordingly, only the principle differences compared to the previous embodiment are described.

In this second embodiment, instead of determining, at each service time moment, whether a guaranteed or non-guaranteed bandwidth share is to be granted as a result of the operation of processing means P1 which performs non work conserving scheduling for the reserved bandwidth, a mode determining means (not shown) is here used in the controller CTRL. The mode determining means readily indicates, at each service time moment, under which mode (G or NG) bandwidth should be granted to a data flow. This means that the mode determining means indicates whether, at that service time moment, guaranteed bandwidth is to be granted (in mode G) in priority, or else non-guaranteed bandwidth is to be granted (in mode NG). Furthermore, depending on the readily determined mode, a subsequent data flow selection process is performed by the scheduler for granting either guaranteed or non-guaranteed bandwidth to a data flow.

As explained further, the main advantages of such an implementation of a dual-mode scheduler are two-folded, namely:

Due to the foregoing decision made by the mode determining means, only one single dual-mode scheduler is required to execute the subsequent data flow selection process for granting, at each service time moment, guaranteed or non-guaranteed bandwidth; and The operation of the scheduler is here work conserving also when sharing guaranteed bandwidth in mode G, since Mode G is always performed in priority over Mode NG.

A preferred solution for implementing the mode determining means comprises:

a service grant counter (CT1, CT2, . . . , CT16) associated to each one of the data flows (C1, C2, . . . , C16); and a common guaranteed bandwidth share data flow counter (GBSDFC).

A service grant counter CT2 associated to a data flow C2 contains its current credit amount of service grants for guaranteed bandwidth. It is continuously provisioned with additional eligible service grants at a rate that is proportional to the reserved bandwidth MCR2 for that data flow.

Each time that the data flow C2 is served for guaranteed bandwidth share, its counter CT2 is decremented. This operation is possible until its amount of service grant is exhausted. The data flow C2 has not reached its reserved bandwidth share, i.e. has not exhausted its eligible service grant credit, as long as its counter CT2 has still enough credit left for being granted guaranteed bandwidth for its next data packet that is waiting in its associated queue in the buffer BUF.

The common guaranteed bandwidth share data flow GBS-DFC counter is used to record the current number of active data flows which have not reached so far their respective entitled reserved bandwidth share of the total reserved bandwidth. Accordingly, the GBSDFC counter indicates whether a guaranteed bandwidth share (mode G) or a non-guaranteed bandwidth share (mode NG) is to be performed when its content is positive or null respectively.

The service grant counter CT is now described in the following paragraphs.

As concerns the updating of the counter CT of a data flow C that is selected for service, two different situations are possible depending on the types of data packets scheduled by the system:

Either scheduling of fixed-length data packets i.e. cells, in which case the scheduler is defined to be working in 'cell-mode'; or Scheduling of variable-length data packets i.e. frames, in which case the scheduler is defined to be working in 'frame-mode'.

For a scheduler working in 'cell-mode', the service grant counter CT can be handled for instance simply as follows. The initial credit value loaded in a CT counter is conveniently expressed as being, for instance, the respective entitled amount of credited cells for one time period T. This entitled amount of credited cells value is loaded in the CT counter when initialized at the beginning of a new time period T. An active data flow can be selected for guaranteed bandwidth share as long as the content of its associated CT counter has not yet reached zero. This indicates that its current amount of credited cells is still positive and hereby that the data flow has not yet reached its entitled reserved bandwidth share. Each time a data flow is served for guaranteed bandwidth share, its associated CT counter is updated by decrementing its current content by one.

On the other hand, for a scheduler working in 'frame-mode', a classical technique consists in slicing each frame of variable length in a number of consecutive fixed-length segments. A variable-length frame comprises a predefined number S of fixed-length segments and is handled by the scheduler with an identical number of S consecutive service time moments. Accordingly, although that, at each service time moment, a scheduler working in 'frame-mode' handles one fixed-length segment per service time, according to a quite similar way as a scheduler working in 'cell-mode' handles one fixed-length cell, the basic difference between them lies in the scheduling decision. Indeed, when a scheduler selects a variable-length frame for service in 'frame-mode', it decides to grant a bandwidth share for the S consecutive fixed-length segments of the frame, i.e. for S consecutive service time moments starting from the current one. Conversely, when a scheduler selects a fixed-length cell for service in 'cell-mode', it decides to grant a bandwidth share just for that fixed-length cell i.e. just for the current service time moment. In this way, for a scheduler working in 'frame-mode', the CT counters are handled for instance as follows. The initial credit value loaded in a CT counter is conveniently expressed as being the respective entitled amount of credited segments for one time period. This respective entitled amount of credited cells value is loaded in the CT counter when the CT counter is initialized at the beginning of a new time period. An active data flow is selected for guaranteed bandwidth share as long as the content of its associated CT counter is not only not in zero, but also equal to at least the number of segments S of the next frame to be served for that data flow. This indicates that its current amount of credited segments is still positively balanced and thus that the data flow has not reached its entitled reserved bandwidth share. Furthermore, each time a data flow is served for guaranteed bandwidth share, its associated counter is updated by decrementing its current content by S, i.e. the number of fixed length segments of that next frame. As each CT counter is now decremented with a variable number of segments S corresponding to the variable length of each frame, as opposed to a cell-by-cell decrementation by one as in 'cell-mode', its content value does not necessarily reach exactly zero when it becomes no longer positively balanced. Indeed, this depends on the length of successive frames served for the data flow. Therefore, for each data flow, a useful parameter is the credit balance of the CT counter which is defined as the being the difference between its current credit content and the number of segments S of the next frame to be served for that data flow. The credit balance indicates either a positive credit balance if it is positive or null, i.e. when the current amount of credited segments is bigger or equal to S; or the credit balance indicates a negative credit balance if it is negative, i.e. when the current amount of credited segments is smaller then S. Accordingly, a positive credit balance indicates that enough credit remains available for making the next frame eligible for service by the scheduler.

As concerns the provisioning of entitled service grants to each CT counter, a first solution as mentioned in the introductory part, consists in providing a given amount of entitled guaranteed service grants EGSG to each CT counter associated to a data flow C, at the beginning of a predetermined time period T. This credit amount EGSG is proportional to the reserved bandwidth MCR, whereby EGSG=MCR/T.

Different approaches are conceivable for periodically initializing the CT counters with their respective EGSG credit amount. The different solutions are depending on whether the predetermined time period is the same or not for all data flows, and, if the same, whether or not their CT counters are all initialized simultaneously.

In a first approach, all the data flow scheduling time intervals have the same duration and the initialization of their associated CT counters is synchronized in a global periodic cycle T. In such a case, the service grant counters of all data flows are simultaneously initialized by their respective initial credit value EGSG. In such a solution, the scheduler typically runs the following scenario. At the beginning of a periodic cycle, a number of data flows have their service grant counter not yet in zero, thus have not reached their respective entitled reserved bandwidth share, and the scheduler performs Mode G at each successive service time moment. At some point in time, some data flows are still in the some condition, but none of them have a cell, or a segment, waiting to be served. They are all inactive. Then the scheduler starts to perform Mode NG. Later, one or several of these data flows not having reached their respective entitled reserved bandwidth share, may now have at least one cell or one segment waiting. Thus they are becoming active. Then, the scheduler resumes Mode G. This situation continues until, eventual, all data flows have reached their respective entitled reserved bandwidth share-. In this case the scheduler performs Mode NG at each successive service time moment, up to the end of the periodic cycle T, at which point all service grant counters CT are again initialized.

In a second approach, all the data flow scheduling time intervals have the same duration, but the initialization of their associated CT counters is not synchronized for all data flows. In this way, all data flow scheduling time intervals have still the same duration T, but the positioning of their respective time intervals T are somehow scattered in time instead of being synchronized in the same global periodic cycle. The scheduler operation is no longer, or at least much less, correlated for all data flows as in the first solution. In such a solution, the initialization of the service grant counter, associated to the various data flows, is phased at different time instants. It can be verified that such an alternative scattered organization of the data flow scheduling time intervals remains totally compatible with the principle scheduler operation. Indeed, since the scheduler determines at each service time moment whether it should operate in Mode G or in mode NG, whatever the condition of the various CT counters is and independently of the mode G or NG that was determined at previous service time moments, it does not matter when the various CT counters have been mutually initialized i.e. simultaneously or not. A primary effect of scattering the data flow scheduling time intervals is to create some overall mix of service types for both guaranteed and non-guaranteed bandwidth over time. In a practical realization, all the data flows may be for instance splitted in a predefined number of subsets of data flows K, which can be initialized at successive times separated by a duration equal to one Kth of T.

In a third approach, the predefined time period T has a specific duration that is possibly different for the various data flows. Then their time intervals are mutually phased asynchronously. The scheduler operation is no longer correlated at all for all data flows as in the first solution or, to a lesser extent, as in the previous solution. In such a case, the initialization of the service grant counter CT, associated to the various data flows, by their respective credit value EGSG is phased at totally different time instants.

As for the previous alternative solution, it can also be verified that, in such a third alternative, the asynchronous organization of the data flow scheduling time intervals still remains also totally compatible with the principle dual scheduler operation. The primary effect of no longer correlating the data flow scheduling time intervals is to create an overall full mix of service types for both guaranteed and non-guaranteed bandwidth over time. In order to realize such a third alternative solution, different options are conceivable for the initialization of each service grant counter. These different options are offering a flexible choice, for each data flow C2, of its respective time interval value T2 and its respective credit value EGSG2, including the possibility of using the same credit value for all data flows but different time interval values.

Still as concerns the provisioning of entitled service grants to each CT counter, it has to be remarked here that the present invention is not limited to implementations such as described above, i.e. initializing the respective service grant counters CT at the beginning of a predefined time period with a predetermined amount of credits. Indeed, an alternative implementation of the present invention can be realized by provisioning service grant credit units, that are each corresponding to one service time of a cell or a segment, to the respective service grant counters, on a continuous basis proportionally to the reserved bandwidth of each data flow. In such an alternative, for a cell or segment size of B bits, the CT counter of a data flow having a reserved bandwidth MCR is continuously incremented by one service grant credit unit at a credit rate Rc, whereby Rc=MCR/B. Such an implementation provides a better performance and avoids a periodic initialization at the beginning of a predefined time period.

The common guaranteed bandwidth share data flow counter GBSDFC is now described in the following paragraphs. For correctly keeping track of the current number of active data flows which have not reached so far their respective entitled reserved bandwidth share of the total reserved bandwidth, the common GBSDFC counter is decremented either each time an active data flow has reached its respective entitled reserved bandwidth share, or each time an active data flow becomes inactive even if it has not yet reached its respective entitled reserved bandwidth share.

Furthermore, the common GBSDFC counter is incremented either each time a data flow becomes active while it was not previously active and had not yet reached its respective entitled reserved bandwidth share, or each time an active data flow is newly detected as having not yet reached its respective entitled reserved bandwidth share while it was previously considered as having reached the latter. Thereby it is indicated, at each service time moment, whether guaranteed bandwidth is to be granted to an active data flow not having reached its entitled reserved bandwidth share when the common GBSDFC counter is not empty, or non-guaranteed bandwidth is to be granted to an active data flow when the GBSDFC common counter is empty.

By using such a common guaranteed bandwidth share data flow counter in combination with the service grant counters associated to each flow, it is clear that the method of the present invention allows an efficient solution for implementing a mode determining means which discriminates, at each service time moment, whether guaranteed bandwidth or non-guaranteed bandwidth is to be granted by the dual-mode scheduler.

As concerns the scheduling operation itself, allowing to select, at each service time moment, either in mode G or mode NG, one particular data flow to be served first, it is to be explained that different types of scheduling arrangements are possible.

At each service time moment, the scheduler exclusively performs scheduling on the basis of either the reserved bandwidth scheduling parameters, when granting a guaranteed bandwidth share in mode G, or the administrative weight scheduling parameters when granting a non-guaranteed bandwidth share in mode NG. This depends on the mode G or NG performed by the processor as a result of the mode determining means that monitors the overall condition of the service grant counters of all the active data flows. When sharing guaranteed bandwidth in mode G, the operation of the scheduler is here work conserving, since Mode G is always performed in priority over Mode NG.

Generally speaking, different types of classical scheduling techniques can be used for each mode G or NG, such as for instance based on a sorter of smallest time stamp or based on a circular list, usually called round-robin scheduling technique. By combination, typically four examples of solution of scheduling arrangement are conceivable as follows:

Solution 1 using a sorter of smallest time stamp for both mode G and mode NG; and Solution 2 using a sorter of smallest time stamp for mode G and a circular list for mode NG; and Solution 3 using a circular list for both mode G and mode NG; and Solution 4 using a circular list for mode G and a sorter of smallest time stamp for mode G.

These different types of scheduler techniques are now described separately for mode G and for mode NG.

A) Scheduling in Mode G

In the event when mode G is selected by the mode determining means, the scheduler performs a weighted fair share distribution of guaranteed bandwidth among all the currently active data flows which have still enough credit left in their service grant counter, i.e. the data flows which have not yet reached their respective entitled reserved bandwidth share. Therefore, one way or another, this operation implies the need to filter out the data flows which are inactive and/or which have reached their entitled reserved bandwidth share.

A scheduling technique based on a sorter of smallest time stamp for mode G is now described. A weighted fair share distribution of guaranteed bandwidth is achieved by a conventional virtual spacing scheduling based on the reserved bandwidth scheduling parameter per data flow in the memory. At each service time moment in mode G, the selected data flow is the one having the smallest time stamp among the reserved bandwidth scheduling parameters for all active data flows not having reached their respective entitled reserved bandwidth share. It is to be noted that the initialization and calculation of the reserved bandwidth scheduling parameter timestamp is similar to the one described in the first embodiment. This means that the scheduling parameter timestamp is calculated as a function of the associated minimum cell rate. Note however that the scheduler handles here the data flows on the basis of their respective reserved bandwidth scheduling parameter time stamp parameters in a work conserving fashion. A scheduling parameter of a data flow is removed from the memory either:

when a previously active data flow not having reached its respective entitled reserved bandwidth share, becomes inactive; or when an active data flow not having previously reached its respective entitled reserved bandwidth share, is served and exhausts its credit in its service grant counter.

A reserved bandwidth scheduling parameter for a new data flow is introduced in the memory either:

when a previously inactive data flow not having reached its respective entitled reserved bandwidth share, becomes active; or when an active data flow having previously reached its respective entitled reserved bandwidth share receives some new service grant credit provisioned in its service grant counter.

A scheduling technique based on a circular list for mode G is now described. A weighted fair share distribution of guaranteed bandwidth can be alternatively performed by one simple circular list, usually called round robin scheduling technique, of active/credited data flows, in association with their respective service grant credit counters whose entitled credit content are proportional to the respective reserved bandwidth of each data flow. The active/credited data flow circular list contains the identity of all active data flows not having reached their respective entitled reserved bandwidth share.

At each service time moment in mode G, the selected data flow is the one at the head of the circular list, and its identity is then moved at the tail of the circular list. Filtering out a data flow implies to remove the corresponding entry from the active/credited circular list. This occurs either when a previously active data flow not having reached its respective entitled reserved bandwidth share, becomes inactive, or when an active data flow not having previously reached its respective entitled reserved bandwidth share, is served and exhausts its credit in its service grant counter. The introduction of a new data flow entry implies to add it to the active/credited circular list. This occurs either when a previously inactive data flow not having reached its respective entitled respective reserved data share, becomes active, or when an active data flow having previously reached its respective entitled reserved bandwidth share receives a new service grant credit provisioned in its service grant counter.

Accordingly, mode G is performed as long as at least one data flow entry is still present in this active/credited circular list.

B) Scheduling in Mode NG

In the event when mode NG is selected by the mode determining means, the scheduler performs a weighted fair share distribution of non-guaranteed bandwidth among all the currently active data flows. It has to be noted that, when mode NG is performed, all active data flows have necessarily exhausted their respective credit, i.e. have reached their respective entitled reserved bandwidth share, since otherwise mode G would be performed in priority. One way or another, this operation implies the need to filter out the data flows that are inactive.

A scheduling technique based on a sorter of smallest time stamp for mode NG is now described. A weighted fair share distribution of non-guaranteed bandwidth is achieved by a conventional virtual spacing scheduling based on the administrative weight scheduling parameter per data flow in the memory. At each service time moment in mode NG, the selected data flow is the one having the smallest administrative weight scheduling parameter time stamp among all active data flows.

It is to be noted that the initialization and calculation of the administrative weight scheduling parameter timestamp is similar to the one described in the first embodiment. This means that the administrative weight scheduling parameter timestamp is calculated as a function of the associated administrative weight. An administrative weight scheduling parameter of a data flow is removed from the memory either when a previously active data flow becomes inactive or when an active data flow having previously reached its respective entitled reserved bandwidth share receives a new credit by initialization of its service grant counter. An administrative weight scheduling parameter for a new data flow is introduced in memory when a previously inactive data flow becomes active. Mode NG is performed as long as at least one entry of an active data flow is still present in the memory, or until mode G is resumed.

A scheduling technique based on a circular list for mode NG is now described. A weighted fair share distribution of non-guaranteed bandwidth can be alternatively performed by one simple circular list technique of active/credited data flows, in association with a second set of respective extra service grant counters ECT, quite similar to the service grant counters CT, but whose contents are then made proportional to the respective administrative weight scheduling parameter of the data flows. However, one can observe that the respective service grant counters CT are only used for those data flows which have not reached their respective entitled reserved bandwidth share, while the respective extra service grant counters ECT are only used for those data flows which have reached their respective entitled reserved bandwidth share. Therefore, each time an active data flow has exhausted its credit for guaranteed bandwidth distribution, it is conceivable to use its same associated counter means now for non-guaranteed bandwidth grant credit accounting, in a similar way as for basic credit accounting. By doing so, one single counter means associated to each data flow can be advantageously used, either acting as a service grant counter CT when the data flow has not yet reached its respective entitled reserved bandwidth share, or acting as an extra service grant counter ECT when the data flow has reached its entitled reserved bandwidth share.

For using extra service grant counters for scheduling in mode NG, the administrative weight scheduling parameters have to be accommodated in a suitable manner as concerns the provisioning of the respective predefined initial extra service grant credit NGSC value in service grant counters, because the related distribution of non-guaranteed bandwidth should be maintained continuously for each data flow, until it is re-credited with new service grants for guaranteed bandwidth share.

Accordingly, in order to maintain such a continuous weighted fair share distribution of non-guaranteed bandwidth to all active data flows in mode NG, the extra service grant counters ECT of all active data flows must be re-initialized:

simultaneously by reloading them with respective initial extra service grants credits, based on respectively associated administrative weight scheduling parameters; and only when all these active data flows have exhausted their respective initial extra service grant credits NGSC.

Indeed, otherwise the distribution of non-guaranteed bandwidth would not be performed proportionally to their respective administrative weights.

In an example of practical realization, such a re-initialization of initial extra service grant credits NGSC for all active data flows can be functionally achieved simultaneously as required, while avoiding the actual simultaneous reloading of service grant counter contents that can be delayed.

In order to cater for such a delayed reloading of extra service grant credit in the ECT counters, one uses an additional stand-by circular list of active data flows that have exhausted their respective predefined initial extra service grant credit value and that have not received yet a new respective credit value. Then, when the extra grant credits need to be simultaneously re-initialized, a switch-over to this additional stand-by list is performed for replacing the previously used active/credited circular list that is just found empty. When swapping to the stand-by circular list, the re-initialized extra service grant counters are not yet actually reloaded with their respective non-guaranteed bandwidth grant credit. But their presence in this additional circular list, which is now used as new active/credited circular list, at least enables their selection by the scheduler when mode NG is performed. Accordingly, when a data flow is selected the first time after its extra service grant credit has been re-initialized, the fact that it is selected while its extra service grant counter is still not reloaded is detected. Indeed, this implies by implicit rule that the reloading of its extra service grant counter is in fact pending and that it must be thus reloaded with a new extra service grant credit NGSC at that time.

A data flow entry is filtered out by removing it from the active/credited circular list:

when a data flow becomes inactive, when an active data flow has exhausted its extra service grant credit; or when an active data flow having previously reached its respective entitled reserved bandwidth share receives a new respective service grant credit value provisioned in its service grant counter. Furthermore, this removed entry is placed in the above mentioned additional stand-by circular list, but only if the data flow is still active without any extra service grant credit nor respective service credit value left.

Furthermore, a new data flow entry is introduced in the active/credited circular list when it becomes active and if it has still some extra service grant credit left. Mode NG is performed as long as at least one data flow entry is still present in the active/credited circular list, i.e. as long as one data flow is active, unless Mode G is resumed.

A further remark is made regarding the above mentioned first solution, i.e. the solution in which one sorter of time stamps is used for both mode G and mode NG, and in which for each data flow, at any service time moment, only one scheduling parameter is exclusively in use in the memory, namely either its reserved bandwidth scheduling parameter or its administrative weight scheduling parameter. For such an implementation, a filtering method would be sufficient over one single set of time-stamp parameters. Indeed, in mode G, the filtering must only enable the active data flows having a guaranteed bandwidth scheduling parameter in place, i.e. the data flows not having reached their entitled reserved bandwidth share. Furthermore, in mode NG, in principle no filtering is required since all active data flows have reached their entitled reserved bandwidth share and have then its non-guaranteed bandwidth scheduling parameter in place. This means that, in such an implementation, a dual-mode scheduler handles an exclusive mix of reserved bandwidth scheduling time stamp parameters, for data flows to be granted with guaranteed bandwidth share, and of administrative weight scheduling time stamp parameters, for data flows to be granted with non-guaranteed bandwidth share, in the memory.

While the principles of the invention have been described above in connection with specific apparatus, it is to be clearly understood that this description is made only by way of example and not as a limitation on the scope of the invention, as defined in the appended claims.

What is claimed is:

1. A method for sharing available bandwidth on a common link in a communication network among a plurality of data flows being transmitted via said common link, said method executed by a processor, wherein said method comprises:

sharing reserved bandwidth included in said available bandwidth among said plurality of data flows, and sharing unreserved bandwidth among said plurality of data flows according to a respective unreserved data packet share being associated to each one of said plurality of data flows, said unreserved bandwidth being included in said available bandwidth in excess of said reserved bandwidth, wherein sharing said unreserved bandwidth further comprises associating to at least one of said plurality of data flows a respective adaptable administrative weight and determining said respective unreserved data packet share being associated to said at least one data flow based on said respective adaptable administrative weight.

2. The method for sharing available bandwidth according to claim 1, wherein said method further comprises determining said at least one data flow as an active one of said plurality of data flows having at least one data packet in a buffer coupled to said processor.

3. The method for sharing available bandwidth according to claim 1, wherein said processor controls a buffer that stores received data packets, and said sharing of reserved bandwidth further comprises a first process of sharing guaranteed bandwidth, up to an amount of reserved bandwidth predefined for each data flow and included in said available bandwidth, and said sharing of unreserved bandwidth further comprises a second process of sharing non-guaranteed bandwidth among said plurality of data flows according to a respective non-guaranteed bandwidth share, said non-guaranteed bandwidth share comprising the unreserved bandwidth as well as the actually unused part of said reserved bandwidth, said unreserved bandwidth being included in said available bandwidth in excess of said reserved bandwidth, and in that said second process of sharing said non-guaranteed bandwidth comprises associating said respective adaptable administrative weight to at least one of said plurality of data flows, said respective non-guaranteed bandwidth share being determined as a function of said respective adaptable administrative weight associated to said at least one data flow.

4. The method for sharing available bandwidth according to claim 3, wherein at each service time moment, said method further comprises:

determining whether, for at least each active data flow of said plurality of data flows, a respective entitled reserved bandwidth share of said reserved bandwidth has been reached or not; and selecting, when at least one active data flow has not reached its respective entitled reserved bandwidth share, one of said plurality of active data flows not having reached its entitled reserved bandwidth share, whereby guaranteed bandwidth is granted at said service time moment, and selecting, when each one of said plurality of active data flows has reached its respective entitled reserved bandwidth share, one of said plurality of active data flows, whereby non-guaranteed bandwidth is granted at said service time moment.

5. The method for sharing available bandwidth according to claim 3, wherein said method further comprises:

associating to each one of said plurality of data flows a respective service grant counter;

initializing said service grant counter at each start of a predefined time period to a respective predefined initial credit value which is derived from said reserved bandwidth as being equal to the corresponding number of entitled service grants for reserved bandwidth during said predefined time period;

updating, at each service time moment, the respective service grant counter that is associated to the data flow being served at said service time moment, until a respective predefined end value is reached for said respective service grant counter; and detecting that an entitled respective reserved bandwidth share of a data flow is reached when said associated service grant counter reached said respective predefined end value.

6. The method for sharing available bandwidth according to claim 5, wherein, when successively serving complete packets of variable length, said updating of said respective service grant counter is performed by counting a number of service grants in proportion to the length of the served packet.

7. The method for sharing available bandwidth according to claim 5, wherein said predefined time period has the same duration for all data flows.

8. The method for sharing available bandwidth according to claim 7, wherein said predefined time period of same duration is synchronized for all data flows, so that said initializing of said service grant counter of each data flow at each start of the predefined time period is performed simultaneously for all service grant counters of all data flows.

9. The method for sharing available bandwidth according to claim 7, wherein said predefined time period of same duration is not synchronized for all data flows, so that said initializing of said service grant counter of each data flow at each start of the said predefined time period is not performed simultaneously for all service grant counters of all data flows.

10. The method for sharing available bandwidth according to claim 5, wherein said predefined time period has a specific duration for each data flow.

11. The method for sharing available bandwidth according to claim 4, wherein said determining of whether a respective entitled reserved bandwidth share of said reserved bandwidth has been reached or not for at least each active data flow includes a common guaranteed bandwidth share data flow counter, wherein said common guaranteed bandwidth share data flow counter:

records the current number of active data flows not having reached their said respective entitled reserved bandwidth share of said reserved bandwidth for a predefined time period;

decrements each time an active data flow has reached its said respective entitled reserved bandwidth share, or decrements each time an active data flow becomes inactive even if it has not yet reached its said respective entitled reserved bandwidth share;

increments each time a data flow becomes active while it was not previously active and had not yet reached its said respective entitled reserved bandwidth share, or increments each time an active data flow is newly detected as having not yet reached its said respective entitled reserved bandwidth share while it was previously considered as having reached the latter;

and indicates, at each said service time moment, whether guaranteed bandwidth is to be granted to an active data flow not having reached its entitled reserved bandwidth share when said common counter is not empty, or non-guaranteed bandwidth is to be granted to an active data flow when said common counter is empty.

12. The method for sharing available bandwidth according to claim 4, wherein selecting one data flow to be served at each service time moment further comprises:

determining a guaranteed bandwidth schedule parameter for at least each active data flow which has not reached its respective entitled reserved bandwidth share, and providing thereby to each one said guaranteed bandwidth schedule parameter, each guaranteed bandwidth schedule parameter being determined as a function of its said reserved bandwidth;

determining a non-guaranteed schedule parameter for at least each active data flow which has reached its respective entitled reserved bandwidth share, and providing thereby to each one said non-guaranteed schedule parameter, each non-guaranteed schedule parameter being determined as a function of its respective adaptable administrative weight;

performing scheduling on the basis of said guaranteed bandwidth schedule parameter when guaranteed bandwidth is granted to an active data flow having not yet reached its entitled respective reserved bandwidth share;

performing scheduling on the basis of said non-guaranteed schedule parameters when non-guaranteed bandwidth is granted to an active data flow having reached its entitled respective reserved bandwidth share; and selecting, upon reception by said processor of either a granting guaranteed bandwidth signal or a granting non-guaranteed bandwidth signal, according to predefined rules and conditions, a data flow which is detected as being respectively, either the one having lowest value among said guaranteed bandwidth schedule parameter or the one having lowest value among non-guaranteed schedule parameters.

13. The method for sharing available bandwidth according to claim 12, wherein said guaranteed bandwidth schedule parameter is only used for those data flows which have not reached their respective entitled reserved bandwidth share, said non-guaranteed schedule parameter is only used for those data flows which have reached their respective entitled reserved bandwidth share, and each data flow is scheduled at any point in time by using one single schedule parameter in an exclusive way, being either said guaranteed bandwidth schedule parameter or said non-guaranteed schedule parameter.

14. The method for sharing available bandwidth according to claim 4, wherein selecting one data flow to be served at each service time moment further comprises:

maintaining a guaranteed bandwidth data flow circular list of those active data flows which have not reached their respective entitled reserved bandwidth share;

determining a non-guaranteed schedule parameter for at least each active data flow which has reached its respective entitled reserved bandwidth share, and providing thereby to each one said non-guaranteed schedule parameter, each non-guaranteed schedule parameter being determined as a function of its said respective adaptable administrative weight;

performing scheduling on the basis of said guaranteed bandwidth data flow circular list when guaranteed bandwidth is granted to an active data flow having not yet reached its entitled respective reserved bandwidth share;

performing scheduling on the basis of said non-guaranteed schedule parameters when non-guaranteed bandwidth is granted to an active data flow having reached its entitled respective reserved bandwidth share; and selecting, upon reception by said processor either a granting guaranteed bandwidth signal or a granting non-guaranteed bandwidth signal, according to predefined rules and conditions, a data flow which is detected as being respectively either the one at the head of said guaranteed bandwidth data flow circular list or the one having lowest value among said non-guaranteed schedule parameters.

15. The method for sharing available bandwidth according to claim 4, wherein selecting one data flow to be served at each service time moment further comprises:

determining a guaranteed bandwidth schedule parameter for at least each active data flow which has not reached its respective entitled reserved bandwidth share, and providing thereby to each one said guaranteed bandwidth schedule parameter, each guaranteed bandwidth schedule parameter being determined as a function of its said reserved bandwidth;

associating to each one of said plurality of data flows a respective extra service grant counter;

initializing said extra service grant counter of each data flow which has reached its respective reserved bandwidth share, to a respective predefined initial extra service grant credit value which is proportional to said respective adaptable administrative weight, this initialization operation being performed each time all said extra service grant counters have reached a respective predefined end value;

updating, at each service time moment, the respective extra service grant counter that is associated to the data flow being served at said service time moment, until a respective predefined end value is reached for said respective extra service grant counter, the total number of possible updates for an extra service grant counter being in proportion to said respective adaptable administrative weight of said associated data flow;

maintaining a non-guaranteed bandwidth data flow circular list of those active data flows which have reached their respective entitled reserved bandwidth share;

performing scheduling on the basis of said guaranteed bandwidth schedule parameters when guaranteed bandwidth is granted to an active data flow having not yet reached its entitled respective reserved bandwidth share;

performing scheduling on the basis of said non-guaranteed bandwidth data flow circular list when non-guaranteed bandwidth is granted to an active data flow having reached its entitled respective reserved bandwidth share; and selecting, upon reception by said processor either a granting guaranteed bandwidth signal or a granting non-guaranteed bandwidth signal, according to predefined rules and conditions, a data flow which is detected as being respectively either the one having lowest value among said guaranteed bandwidth schedule parameters or the one at the head of said non-guaranteed bandwidth data flow circular list.

16. The method for sharing available bandwidth according to claim 4, wherein selecting one data flow to be served at each service time moment further comprises:

maintaining a guaranteed bandwidth data flow circular list of those active data flows which have not reached their respective entitled reserved bandwidth share;

associating to each one of said plurality of data flows a respective extra service grant counter;

initializing said extra service grant counter of each data flow which has reached its respective reserved bandwidth share, to a respective predefined initial extra service grant credit value which is proportional to said respective adaptable administrative weight, this initialization operation being performed each time all said extra service grant counters have reached a respective predefined end value;

updating, at each service time moment, the respective extra service grant counter that is associated to the data flow being served at said service time moment, until a respective predefined end value is reached for said extra respective service grant counter, the total number of possible updates for an extra service grant counter being in proportion to said respective adaptable administrative weight of said associated data flow;

maintaining a non-guaranteed bandwidth data flow circular list of those active data flows which have reached their respective entitled reserved bandwidth share;

performing scheduling on the basis of said guaranteed bandwidth data flow circular list when guaranteed bandwidth is granted to an active data flow having not yet reached its entitled respective reserved bandwidth share;

performing scheduling on the basis of said non-guaranteed bandwidth data flow circular list when non-guaranteed bandwidth is granted to an active data flow having-reached its entitled respective reserved bandwidth share; and selecting, upon reception by said processor either a granting guaranteed bandwidth signal or a granting non-guaranteed bandwidth signal, according to predefined rules and conditions, a data flow which is detected as being respectively either the one at the head of said guaranteed bandwidth data flow circular list or the one at the head of said non-guaranteed bandwidth data flow circular list.

17. The method for sharing available bandwidth according to claim 15, wherein, when successively serving complete packets of variable length, said updating of said respective extra service grant counter is performed by counting a number of service grants in proportion to the length of the served packet.

18. The method for sharing available bandwidth according to claim 15, wherein said respective service grant counter is only used for those data flows which have not reached their respective entitled reserved bandwidth share, said respective extra service grant counter is only used for those data flows which have reached their respective entitled reserved bandwidth share, and a counter associated to each data flow is used, either acting as said respective service grant counter for a data flow which has not yet reached its entitled respective reserved bandwidth share, or acting as said respective extra service grant counter for a data flow which has reached its entitled respective reserved bandwidth share.

19. A processor to share available bandwidth on a common link in a communication network among a plurality of data flows being transmitted via said common link, said processor comprising:

a first processing means to share reserved bandwidth included in said available bandwidth among said plurality of data flows according to a respective reserved data packet share being associated to each one of said plurality of data flows, a second processing means to share unreserved bandwidth among said plurality of data flows according to a respective unreserved data packet share being associated to each one of said plurality of data flows, said unreserved bandwidth being included in said available bandwidth in excess of said reserved bandwidth, associating means to associate to at least one of said plurality of data flows an adaptable administrative weight, and that said second processing means comprises second determining means to determine said respective unreserved data packet share being associated to said at least one data flow in function of said respective adaptable administrative weight, and a control means to control said first processing means and said second processing means and to provide a shared bandwidth signal being a measure for said respective reserved data packet share and said respective unreserved data packet share.

20. The processor to share available bandwidth according to claim 19, wherein said processor further comprises third determining means to determine said at least one data flow as an active one of said plurality of data flows having at least one data packet in a buffer coupled to said processor.

21. The processor to share available bandwidth according to claim 19, wherein said first processing means comprises:

first determining means to determine said respective reserved data packet share in function of a minimum data packet rate being associated to said each one data flow and which guarantees for said each one data flow a minimum guaranteed bandwidth, and wherein said control means activates said second processing means in the event when said minimum guaranteed bandwidth being respected by said first processing means.

22. The processor according to claim 19, wherein said processor supports a guaranteed frame rate service in an asynchronous transfer mode telecommunication system.

23. The processor according to claim 19, wherein said processor supports a variable length packet telecommunication system.

24. A scheduler in a communication network to share available bandwidth on a common link among a plurality of data flows being transmitted via said common link, said scheduler comprising:
- a buffer to sort incoming data packets of said plurality of data flows provided at an at least one input of said scheduler, according to its associated data flow, into a plurality of buffer queues being included in said buffer and each one being associated to one of said plurality of data flows, and to provide thereby a plurality of sorted data packets,
- a selection means to select one of said plurality of sorted data packets in order to transmit said one sorted data packet on said common link,
- wherein said scheduler further comprises a processor according to claim 19, said processor being coupled to said selection means in order to control said selection according to said shared bandwidth signal.

25. An intelligent buffer in a communication network to share available bandwidth on a common link among a plurality of data flows being transmitted via said common link, said intelligent buffer comprising:
- a decision means to decide whether to accept or to discard an incoming data packet of one of said plurality of data flows provided at an at least one input of said intelligent buffer, and to provide thereby in the event when said incoming data packet is accepted, an accepted data packet,
- a buffer means being coupled to said decision means to store said accepted data packet and to transmit said accepted data packet on said common link, wherein said intelligent buffer further comprises a processor according to claim 19, said processor being coupled to said decision means in order to control said decision according to said shared bandwidth signal.

26. A telecommunication system characterized in that said telecommunication system comprising at least one processor as described in claim 19.

27. A processor to share available bandwidth on a common link in a communication network among a plurality of data flows being transmitted via said common link, said processor comprising:
- a first processor to share reserved bandwidth included in said available bandwidth among said plurality of data flows according to a respective reserved data packet share being associated to each one of said plurality of data flows,
- a second processor to share unreserved bandwidth among said plurality of data flows according to a respective unreserved data packet share being associated to each one of said plurality of data flows, said unreserved bandwidth being included in said available bandwidth in excess of said reserved bandwidth,
- a memory that associates to at least one of said plurality of data flows an adaptable administrative weight, and that said second processor comprises an unreserved packet share determiner circuit that determines said respective unreserved data packet share being associated to said at least one data flow in function of said respective adaptable administrative weight, and
- a controller that controls said first processor and said second processor and to provide a shared bandwidth signal being a measure for said respective reserved data packet share and said respective unreserved data packet share.

28. The processor to share available bandwidth according to claim 27, wherein said processor further comprises an active flow determiner circuit that determines said at least one data flow as an active one of said plurality of data flows having at least one data packet in a buffer coupled to said processor.

29. The processor to share available bandwidth according to claim 27, wherein said first processor comprises:
- reserved packet share determiner circuit that determines said respective reserved data packet share in function of a minimum data packet rate being associated to said each one data flow and which guarantees for said each one data flow a minimum guaranteed bandwidth, and
- wherein said control means activates said second processor in the event when said minimum guaranteed bandwidth being respected by said first processor.

30. The processor according to claim 19, wherein said processor supports a guaranteed frame rate service in an asynchronous transfer mode telecommunication system.

31. The processor according to claim 27, wherein said processor supports a variable length packet telecommunication system.

32. A scheduler in a communication network to share available bandwidth on a common link among a plurality of data flows being transmitted via said common link, said scheduler comprising:
- a buffer to sort incoming data packets of said plurality of data flows provided at an at least one input of said scheduler, according to its associated data flow, into a plurality of buffer queues being included in said buffer and each one being associated to one of said plurality of data flows, and to provide thereby a plurality of sorted data packets,
- a selector to select one of said plurality of sorted data packets in order to transmit said one sorted data packet on said common link,
- wherein said scheduler further comprises a processor according to claim 27, said processor being coupled to said selector in order to control said selection according to said shared bandwidth signal.

33. An intelligent buffer in a communication network to share available bandwidth on a common link among a plurality of data flows being transmitted via said common link, said intelligent buffer comprising:
- a decision circuit that decides whether to accept or to discard an incoming data packet of one of said plurality of data flows provided at an at least one input of said intelligent buffer, and to provide thereby in the event when said incoming data packet is accepted, an accepted data packet, and
- a buffer being coupled to said decision circuit to store said accepted data packet and to transmit said accepted data packet on said common link,
- wherein said intelligent buffer further comprises a processor according to claim 27, said processor being coupled to said decision means in order to control said decision according to said shared bandwidth signal.

34. A telecommunication system characterized in that said telecommunication system comprising at least one processor as described in claim 27.

* * * * *